(12) United States Patent
Schoemig et al.

(10) Patent No.: US 11,852,088 B2
(45) Date of Patent: Dec. 26, 2023

(54) METHOD, COMPUTING UNIT, AND COMPUTER PROGRAM FOR DETERMINING AN AMOUNT OF HYDROCARBONS IN AN EXHAUST GAS OF A LEAN-OPERATION INTERNAL-COMBUSTION ENGINE

(71) Applicant: Robert Bosch GmbH, Stuttgart (DE)

(72) Inventors: Herbert Schoemig, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/171,099

(22) Filed: Feb. 17, 2023

(65) Prior Publication Data
US 2023/0265806 A1    Aug. 24, 2023

(30) Foreign Application Priority Data
Feb. 18, 2022   (DE) ...................... 10 2022 201 686.6

(51) Int. Cl.
*F01N 3/00*     (2006.01)
*F02D 41/02*    (2006.01)
(Continued)

(52) U.S. Cl.
CPC ........... *F02D 41/024* (2013.01); *F01N 3/103* (2013.01); *F01N 11/002* (2013.01);
(Continued)

(58) Field of Classification Search
CPC .... F01N 3/103; F01N 11/002; F01N 2550/02; F01N 2560/06; F02D 41/025; F02D 41/027
See application file for complete search history.

(56) References Cited

U.S. PATENT DOCUMENTS

| | | | | |
|---|---|---|---|---|
| 5,860,277 A | * | 1/1999 | Schnaibel | ............... F01N 9/005 60/276 |
| 8,826,645 B2 | * | 9/2014 | Oemke | ................. F01N 11/005 60/285 |

(Continued)

FOREIGN PATENT DOCUMENTS

| | | |
|---|---|---|
| DE | 4426020 A1 | 2/1996 |
| DE | 10033159 A1 | 1/2002 |

*Primary Examiner* — Matthew T Largi
(74) *Attorney, Agent, or Firm* — Michael Best & Friedrich LLP

(57) ABSTRACT

A method (200) for determining an amount of hydrocarbons in an exhaust gas (10) downstream of a lean-operation internal-combustion engine (110), comprising the following steps: observing a first catalyst heating mode of the internal-combustion engine (110) at a high catalyst temperature, wherein a predefinable amount of fuel having a predominantly non-combusting portion is introduced into a combustion chamber of the internal-combustion engine (110); determining an actual temperature change downstream of an oxidation catalyst (120) downstream of the internal-combustion engine (110) during the first catalyst heating mode; and determining the amount of hydrocarbons (cHC) in the exhaust gas (10) upstream of the oxidation catalyst (120) based on the actual temperature change. Furthermore, a computing unit (140) and a computer program for carrying out such a method (200) are proposed.

9 Claims, 6 Drawing Sheets

(51) Int. Cl.
  *F01N 11/00*   (2006.01)
  *F01N 3/10*    (2006.01)
(52) U.S. Cl.
  CPC ......... *F02D 41/025* (2013.01); *F02D 41/027* (2013.01); *F01N 2550/02* (2013.01); *F01N 2550/04* (2013.01); *F01N 2560/06* (2013.01)

(56) References Cited

U.S. PATENT DOCUMENTS

| | | | |
|---|---|---|---|
| 11,359,529 B2 * | 6/2022 | Sculto | B01D 53/9495 |
| 2008/0264037 A1 * | 10/2008 | Takahashi | F01N 11/002 |
| | | | 60/303 |
| 2009/0044517 A1 * | 2/2009 | Oba | B01D 53/9495 |
| | | | 60/285 |
| 2011/0296816 A1 * | 12/2011 | Parmentier | F01N 11/005 |
| | | | 60/274 |
| 2012/0180456 A1 * | 7/2012 | Yamada | F02D 41/047 |
| | | | 60/274 |
| 2015/0165379 A1 * | 6/2015 | Eager | F01N 13/0097 |
| | | | 422/109 |
| 2022/0049636 A1 * | 2/2022 | Van Nieuwstadt | F01N 11/002 |
| 2023/0141389 A1 * | 5/2023 | Usui | F02D 41/1446 |
| | | | 701/99 |

* cited by examiner

METHOD, COMPUTING UNIT, AND COMPUTER PROGRAM FOR DETERMINING AN AMOUNT OF HYDROCARBONS IN AN EXHAUST GAS OF A LEAN-OPERATION INTERNAL-COMBUSTION ENGINE

BACKGROUND OF THE INVENTION

The present invention relates to a method for determining an amount of hydrocarbons in an exhaust gas of a lean-operation internal-combustion engine, as well as a computing unit and computer program for carrying out the method.

In an incomplete combustion of the air-fuel mixture in an engine, in addition to nitrogen ($N_2$), carbon dioxide ($CO_2$) and water ($H_2O$), a variety of combustion products are expelled, of which hydrocarbons (HC), carbon monoxide (CO), and nitrogen oxides ($NO_x$) are limited by law. The applicable exhaust limits for motor vehicles can typically be met only with a catalytic exhaust aftertreatment. The catalysts used in order to do so provide for a nearly complete conversion of these pollutants when in the operationally warm state. Chemical reactions are carried out in the catalyst. For example, HC and CO are oxidized into $CO_2$ and water. $NO_x$ is reduced to $N_2$.

In order for these catalytic reactions to proceed as intended, the temperatures in the catalyst typically must exceed the so-called light-off temperature of typically (in the case of a three-way catalyst, TWC) 300-400° C. In diesel oxidation catalysts (DOC), the light-off temperature is typically in a range between 140 and 300° C. Once reached or exceeded, the catalyst converts the relevant pollutants nearly entirely. In the context of diesel engines, other types of catalysts, e.g. SCR catalysts, can also be used, which must also be operated in a respective temperature range for effective exhaust gas cleaning.

In order to achieve this state as quickly as possible, so-called internal motor catalyst heat uptakes can be applied. The efficiency of the internal-combustion engine is thereby, for example, deteriorated by late ignition angles, and the exhaust temperature and enthalpy input into the catalyst is thus increased. With adapted injection strategies (e.g. multiple injections), combustion stability can simultaneously be ensured.

Further, it is possible to also generate heat outside the internal-combustion engine. For example, non-combusted fuel can be oxidized on an already (at least partially) catalyzable catalyst surface in an exothermic reaction.

SUMMARY OF THE INVENTION

According to the invention, a method for determining an amount of hydrocarbons in an exhaust gas of a lean-operation internal-combustion engine as well as a computing unit and a computer program for carrying out said method having the features of the independent claims are proposed. Advantageous configurations are the subject-matter of the subclaims and the following description.

In detail, the method according to the invention comprises observing a first catalyst heating mode of the internal-combustion engine at a high catalyst temperature, wherein a predefinable amount of fuel having a predominantly non-combusting portion is introduced into a combustion chamber of the internal-combustion engine; determining an actual temperature change downstream of an oxidation catalyst downstream of the internal-combustion engine during the first catalyst heating mode; and determining the amount of hydrocarbons in the exhaust gas upstream of the oxidation catalyst based on the actual temperature change. The change in temperature downstream of an oxidation catalyst (also referred to as an exothermic stroke) due to the exothermic reaction of non-combusted fuel with oxygen on the catalyst material is a good indicator of the level of non-combusted fuel in the exhaust gas upstream of the catalyst. Generally, with high conversion capability of the hydrocarbon catalyst, a direct proportionality between the concentration of hydrocarbon upstream of the catalyst and the exothermic stroke can be assumed. The first catalyst temperature during the first catalyst heating mode is therefore advantageously so high that a high catalytic capability of the catalyst can be safely assumed, well above the typical light-off temperature of the catalyst.

Advantageously, the method further comprises a calculation of an expected temperature change downstream of the oxidation catalyst, taking into account the predefinable amount of fuel, and a correction of the calculation of the expected temperature change based on a difference between the actual temperature change and the expected temperature change. Because the fuel amount is generally known from the control of the fuel metering, the expected temperature change can be used in order to check the accuracy of the fuel metering and, accordingly, can correct or account for deviations between the expected and actual exothermic stroke. In particular, the method can further comprise an adjustment the predefinable amount of fuel based on the actual and/or expected temperature change. Thus, a calibration of the fuel metering or the calculation of the exothermic stroke can be performed. As a result, the control of the exhaust system can be specified and improved.

In particularly advantageous configurations, the method comprises the observation or carrying out of a second catalyst heating mode of the internal-combustion engine at a second catalyst temperature, which is well below the aforementioned first catalyst temperature, taking into account the correction of the calculation of the expected temperature change and/or taking into account the adjustment of the predefinable amount of fuel; calculating a further expected temperature change downstream of the oxidation catalyst during the second catalyst heating mode; determining a further actual temperature change downstream of the oxidation catalyst during the second catalyst heating mode; and assessing a catalyst efficiency based on a difference between the further expected temperature change and the further actual temperature change in phases in which the catalyst has a temperature (second catalyst temperature) which is only slightly above the usual light-off temperature, for example. Thus, the catalytic capability can be assessed and a defect or aging of the catalyst can be detected before an emissions-relevant total failure occurs.

In particular, the expected and/or further expected temperature change is determined using a first computational rule that calculates the theoretical temperature downstream of the catalyst under the prerequisite of a normal phase in which no fuel is introduced into the combustion chamber of the internal-combustion engine after the cycle segment, and using a second computational rule that calculates the theoretical temperature downstream of the catalyst, taking into account the non-combusting portion of the amount of fuel. In other words, a first temperature model that calculates the temperature in the normal mode can be combined with a second temperature model that calculates the temperature that takes into account the exothermic stroke. The first temperature model can thus be used as a reference model, while the second temperature model specifically depicts the exothermic behavior of the catalyst. In this case, only the second temperature model is dependent on the amount of fuel upstream of the catalyst, such that, outside of the catalyst heating mode, the reference temperature model can be calibrated and, during the catalyst heating mode, the amount of fuel can be calibrated depending on the catalyst temperature (at a first catalyst temperature that is certainly significantly above the light-off temperature) or the catalytic capability of the catalyst can be assessed (preferably after the fuel amount and catalyst temperature have already been calibrated just above (e.g. 1, 2, 3, 4, 5, or up to 10° C. above) the light-off temperature of a catalyst in accordance with specifications).

Advantageously, the first catalyst heating mode with a high catalyst temperature is used in order to regenerate a particulate filter. This is advantageous, because particulate filter regeneration requires a high exhaust temperature anyway, and the catalyst is therefore safely above the minimum temperature required for conversion.

Advantageously, a weighting factor based on a confidence factor of the determination of the amount of hydrocarbons in the exhaust gas and/or a temporal delay between a change in the amount of hydrocarbons in the exhaust gas and a change in temperature downstream of the catalyst is calculated and accounted for in the calculation of the expected temperature change. This can prevent an "escalation" when adjusting the calculation.

Preferably, the weighting factor is calculated as a quotient from a temperature change calculated based on the amount of hydrocarbons accounted for with the confidence factor and the temperature change expected without consideration of the confidence factor.

A computing unit according to the invention, e.g. a control unit of a vehicle, is configured, in particular in terms of program technology, so as to carry out a method according to the invention.

The implementation of a method according to the invention in the form of a computer program or computer program product with program code for carrying out all method steps is also advantageous, because this results in particularly low costs, in particular if an executing control device is also used for further tasks and is therefore present in any event. Lastly, a machine-readable storage medium is provided, on which the computer program is stored as described above. Suitable storage media or data carriers for providing the computer program are in particular magnetic, optical and electrical memories such as hard disks, flash memory, EEPROMs, DVDs, etc. Downloading a program via computer networks (Internet, Intranet, etc.) is possible as well. Such a download can be wired or cabled or wireless (e.g. via a WLAN, a 3G, 4G, 5G or 6G connection, etc.).

BRIEF DESCRIPTION OF THE DRAWINGS

Further advantages and configurations of the invention will emerge from the description and the accompanying drawing.

The invention is illustrated schematically in the drawing on the basis of embodiment examples and is described in detail in the following with reference to the drawing.

DETAILED DESCRIPTION

Figure 1:
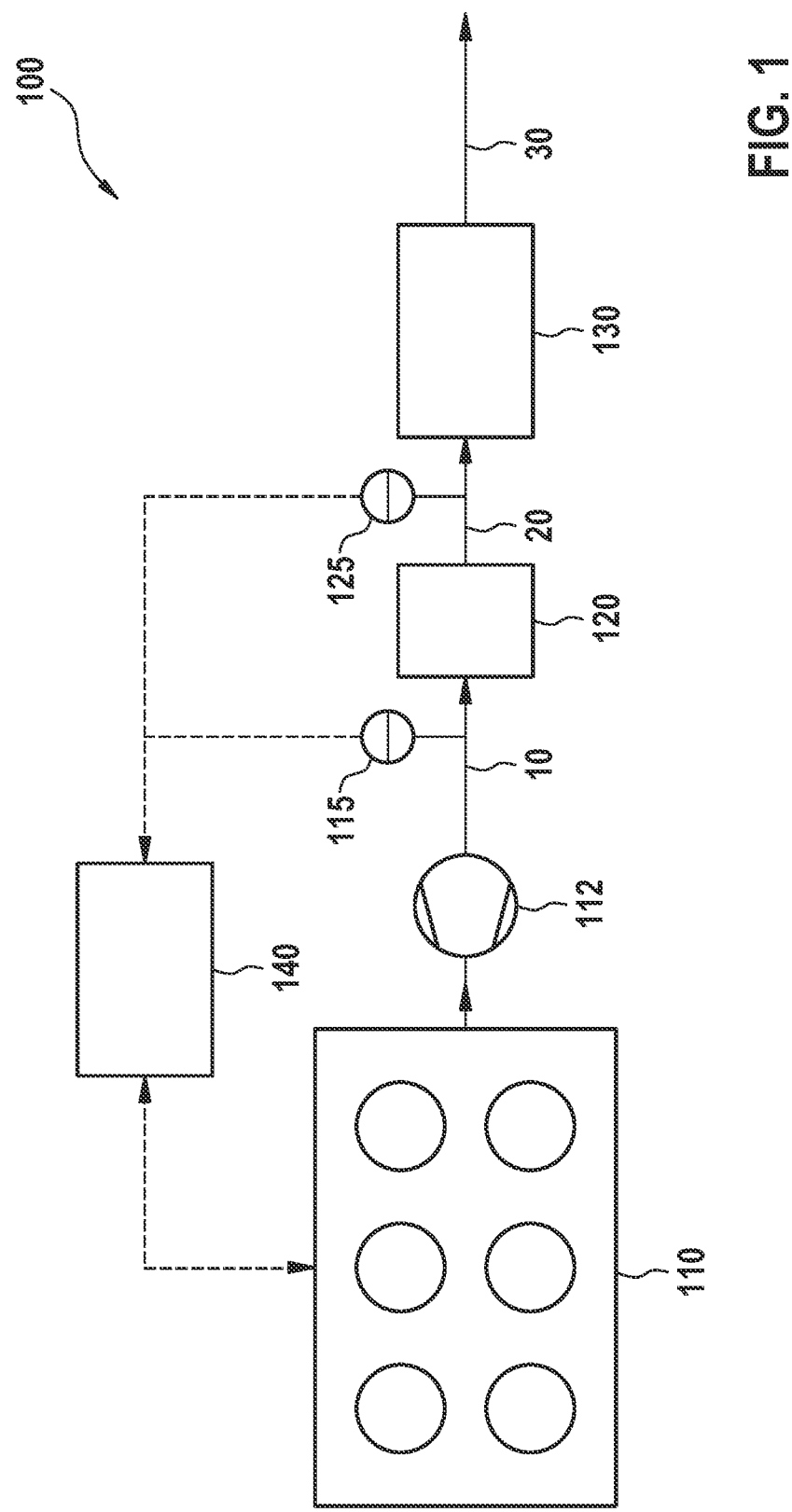
FIG. 1 shows embodiment configuration of an exhaust system as it can be used in advantageous configurations of the invention.

In the following, the invention is explained using the example of a diesel engine 110 as a lean-operation internal-combustion engine having an exhaust system as shown schematically in FIG. 1 and bearing the overall reference numeral 100. The exhaust system comprises a diesel oxidation catalyst (DOC) 120 and a subsequent particulate filter 130 in DPF form (diesel particulate filter) or in SCRF form (selective catalytic reaction on filter). Typically, such a system 100 is equipped with an exhaust temperature sensor 115 upstream of the catalyst 120 and an exhaust temperature sensor 125 downstream of the catalyst 120.

The particulate filter 120 requires a periodic regeneration phase in order to burn off the accumulated soot mass. This regeneration phase requires heating of the particulate filter 120 to a temperature above, for example, 600° C. For this purpose, in addition to internal engine heating for increasing the engine output temperature, such as by throttling the engine 110 or activating an attached after-injection, so-called "catalyst heating" can also be used. In the latter, the HC raw emissions of the internal-combustion engine 110 are purposefully increased by activation of late after-injections, which, by exothermic oxidation of the hydrocarbons on the catalyst 120, results in an increase in the exhaust temperature downstream of the catalyst 120 and thus also an increase in the particulate filter temperature.

Figure 2:
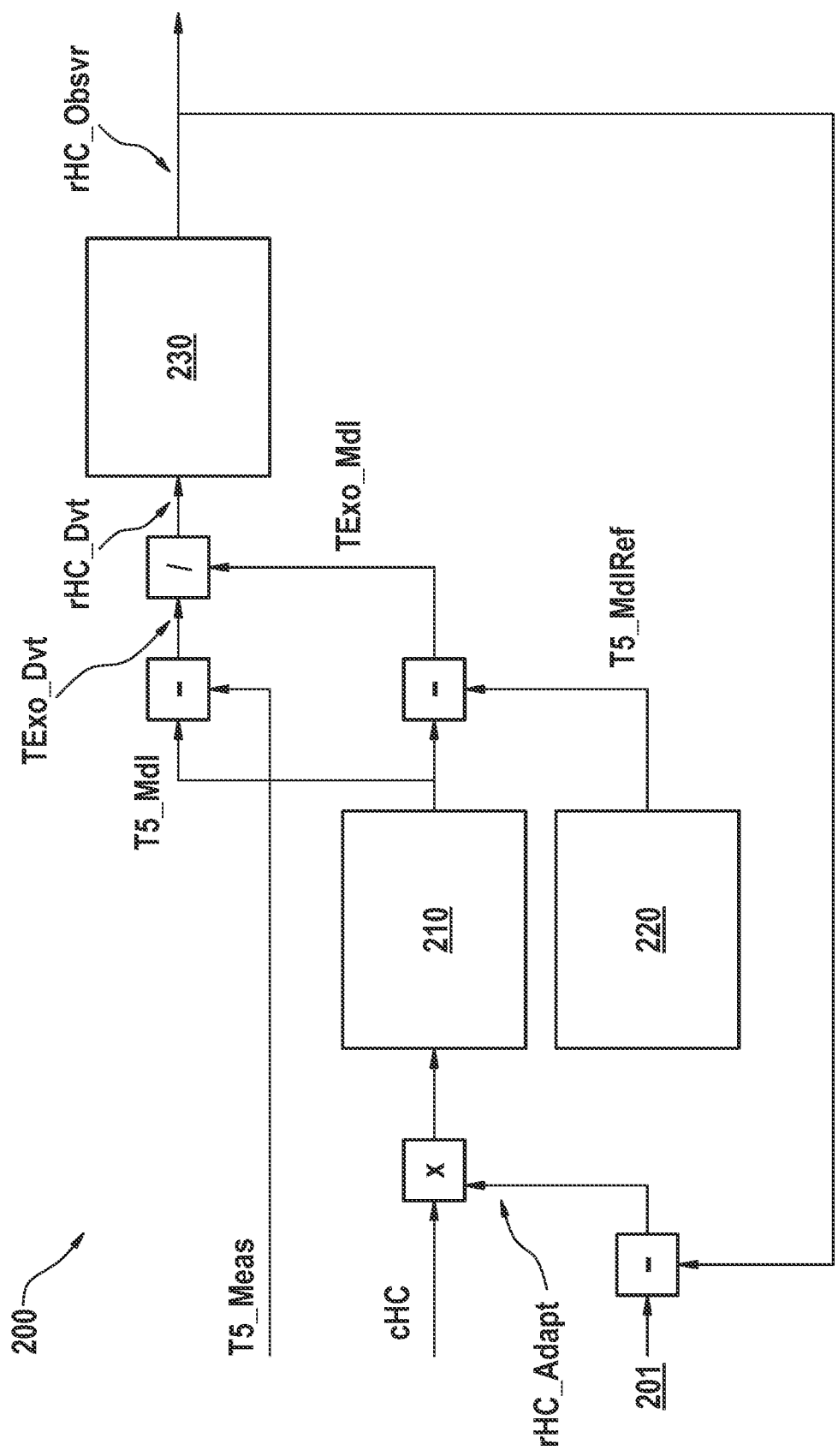
FIG. 2 shows an advantageous configuration of the invention in the form of a highly simplified block diagram.

In FIG. 2, an advantageous configuration of the invention, for example an implementation of a method according to the invention, is shown in the form of a highly simplified block diagram and is bears the overall reference numeral 200.

The method 200 is based on a measurement of the HC concentration during a regeneration phase of the particulate filter 130. This is to be done using two thermodynamic models of the catalyst 120. A first model 210 simulates the thermal behavior of a fully functional catalyst 120 and provides a model value T5_Mdl for the temperature downstream of the catalyst at the position of an installed temperature sensor 125. A second model 220 mimics the exothermy-free behavior of the catalyst 120, i.e. without an HC supply, and also provides a model value T5_MdlRef for the position of the temperature sensor 125. In addition to the temperature (T4 in FIG. 4), upstream of the catalyst 120, for example, which can be determined with the sensor 115 shown in FIG. 1, and the exhaust mass flow rate dmEG, the main input variables of the first model 210 for T5_Mdl include in particular the HC concentration upstream of the catalyst 120, i.e. the motor-side HC raw emission concentration cHC. Typically, there is no sensory system for the HC concentration, so that an HC model (cHC_Mdl in FIG. 4) can be used here whose influence on the temperature model or its output value is corrected as part of method 200. The person skilled in the art is already aware of temperature models with a quality sufficient for the invention (e.g. based on physical heating power balancing in the catalyst with data-based HC conversion efficiency), so that a detailed description can be omitted here.

In an operationally warm catalyst 120, the HC concentration causes a proportional exothermic effect on the catalyst 120, i.e. the exothermic stroke TExo downstream of the catalyst 120 is a direct measure of the HC concentration in the exhaust 10 upstream of the catalyst. The exothermic stroke can be calculated as the difference between the temperature T5_Mdl and the reference model temperature T5_MdlRef.

$$cHC \sim TExo \sim (T5\_Mdl - T5\_MdlRef)(=TExo\_Mdl \text{ in FIG. 4})$$

By using a sensor temperature T5_Meas determined by the sensor 125 downstream of the catalyst 120, a measured exothermic stroke TExo_Meas (not shown) can be determined, whereas, using the temperature model value T5_Mdl, a modeled exothermic stroke TExo_Mdl can be determined, which corresponds to an expected value in case of full HC turnover.

If deviations of the real HC concentration from the HC raw emission model occur due to system tolerances, then the relative accuracy of the HC model rHC_Acc is immediately reflected by the ratio of measured and modeled exothermic stroke.

$$rHC\_Acc = TExo\_Meas/TExo\_Mdl$$

Thus, a value of 0.9 for the relative accuracy rHC_Acc means that 90% of the expected or modeled exothermic effect is actually measured or a relative deviation rHC_Dvt of 10% is present, which can be determined from the modeled and measured temperatures, as shown in FIG. 2.

$$rHC\_Dvt = (T5\_Mdl - T5\_Meas)/TExo\_Mdl = TExo\_Dvt/TExo\_Mdl$$

In addition to particulate filter regeneration, the late after-injection or catalyst heating measure is used in order to warm up the exhaust system after a cold start of the internal-combustion engine 110. In this region, there are further tolerances compared to regeneration operation, in particular the tolerance-based turnover capability of the catalyst 120 at the temperatures prevailing in the heating mode, which make it impossible to determine the accuracy of the injection or the HC model, respectively. Furthermore, in this heating mode, the catalyst diagnostics are performed, the feature of which is a reduced turnover that cannot be distinguished from reduced HC raw emission in such a situation.

The method 200 therefore provides for an adaptation of the HC raw emission model, which is to cooperate during the catalyst monitoring (in the heating mode) with an adaptation factor determined during the particulate filter regeneration rHC_Adapt corresponding to the accuracy factor rHC_Acc. In an alternative configuration, the actual adaptation factor is derived from the above-mentioned accuracy factor, e.g. via a transfer characteristic curve. In a further configuration, the adaptation factor also functions in the control and regulation of the heating mode itself.

$$rHC\_Adapt = rHC\_Acc = (1 - rHC\_Dvt)$$

$$cHC\_MdlAdapt = cHC\_Mdl * rHC\_Adapt$$

In the following, two embodiments will be described for the principle of HC model adaptation just mentioned. In a first embodiment, an already established catalyst monitoring function, which is effective during particulate filter regeneration, is to be used in order to determine the adaptation factor rHC_Adapt. In a second embodiment, a self-contained observer structure is to be used in order to determine the adaptation factor rHC_Adapt.

The catalyst monitoring of the aforementioned first embodiment, which is active during a particulate filter regeneration, already determines as the monitoring value a ratio number rHC_Acc of measured and modeled exothermy, as described above. This amount is used there as a measure for the HC turnover capability of the catalyst 120. Depending on the application of the monitoring function, one or more values for the exothermic ratio number rHC_Acc are determined per particulate filter regeneration. In the context of this embodiment example, multiple values of the exothermic ratio number rHC_Acc are used by one or more particulate filter regenerations in order to determine an adaptation factor rHC_Adapt. For this purpose, an averaged adaptation value can be determined from multiple individual values. Various embodiments are possible for the averaging algorithm. Examples of this include a simple-moving-average (SMA) filter and an exponentially-weighted-moving-average (EWMA) filter.

In the aforementioned second embodiment, an observer structure is to be used in order to determine the adaptation factor, which is activated during a particulate filter regeneration. This is shown in FIG. 2 and bears the reference numeral 230. For this purpose, the relative HC model deviation rHC_Dvt is supplied to an observer.

Figure 3:
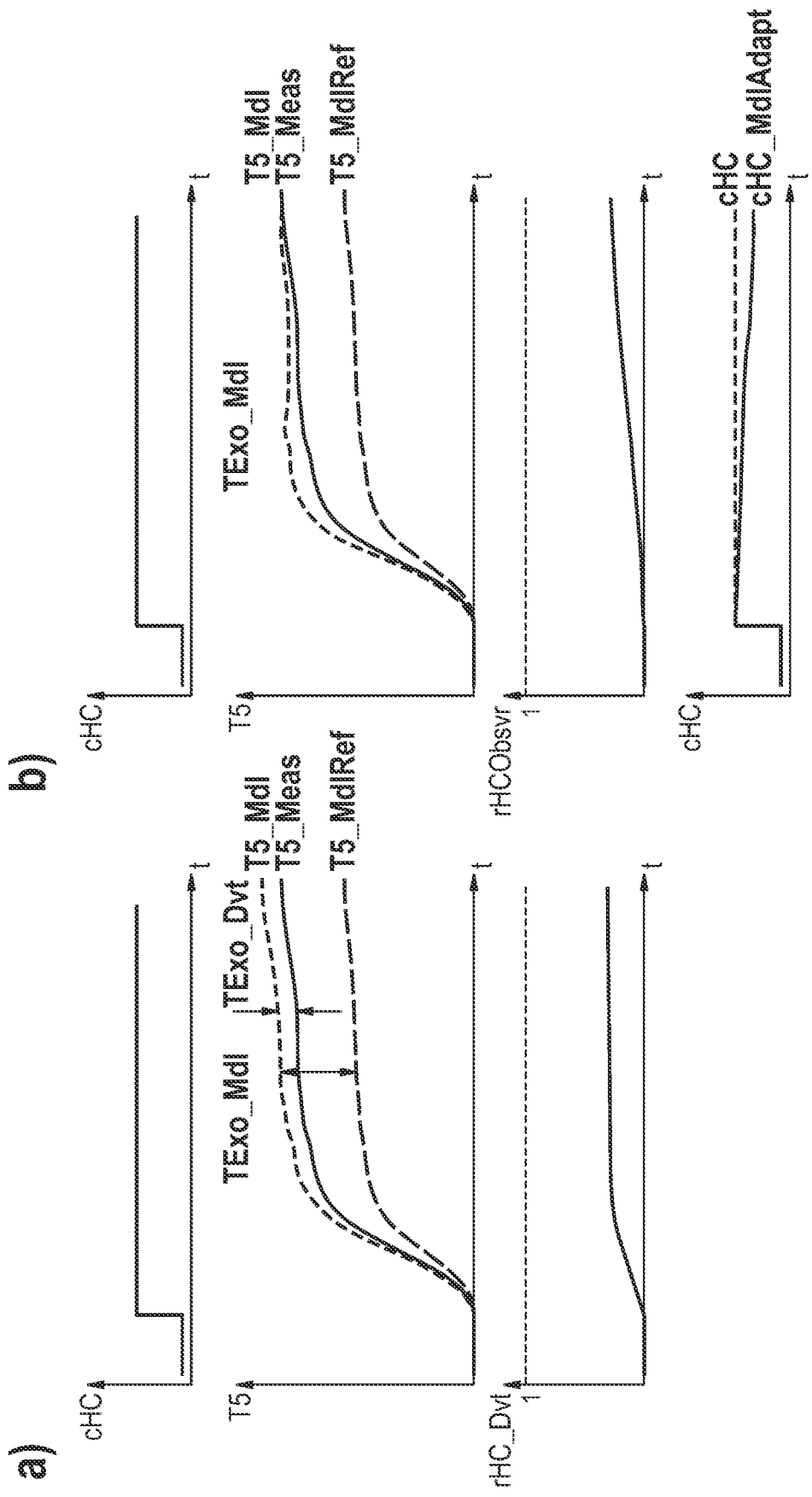
FIG. 3 shows schematically typical signal profiles when using the adaptation in comparison to a situation without an adaptation factor.

The observer output rHC_Obsvr is then used for an adaptation of the HC model value. This adjusted HC model value is ultimately re-coupled into the calculation of the temperature model T5_Mdl, so that the remaining deviation rHC_Dvt strives to be permanently zero. This is illustrated in FIG. 3, by way of example. Under a), a situation without adaptation is shown, while under b), the development of model and measured values using the adaptation of the HC concentration based on the observed deviation is shown upstream of the catalyst 120. It can be clearly discerned that, without adaptation, an initially increasing and then stabilizing deviation between the model and reality results, while this deviation is compensated for by the adaptation. At the end of the adaptation, the model and measured value of the temperature downstream of the catalyst 120 substantially coincide.

Figure 4:
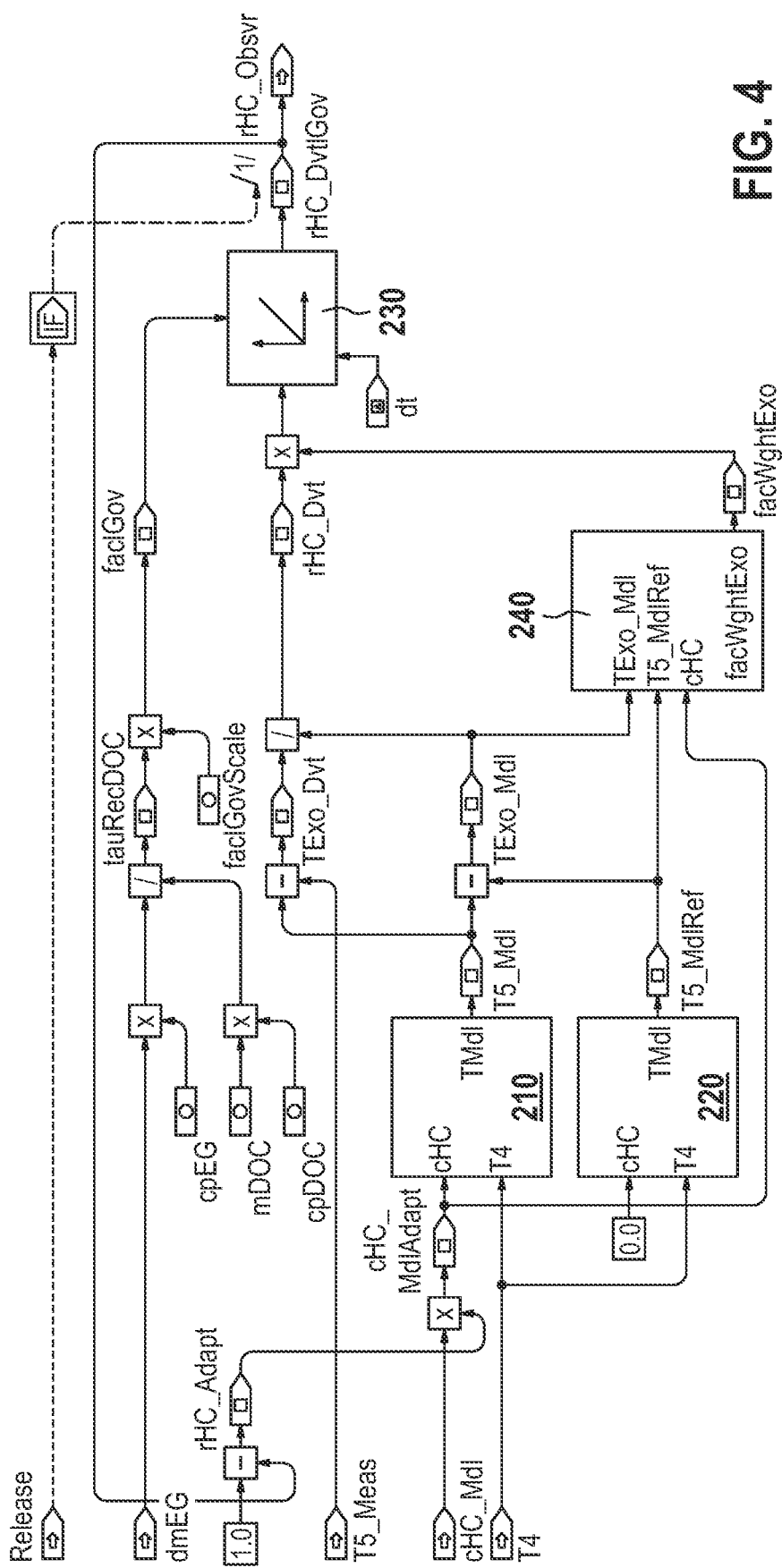
FIG. 4 shows an advantageous configuration of the invention in the form of a schematic block diagram.

FIG. 4 shows a more detailed illustration of the function described. The observer 230 is realized here by an integrator element, by way of example. The temporal constant of the integrator element is to be applicable by the catalyst 120 tauRecDOC depending on the reciprocal value of the characteristic time for the heat flow rate. A currently high value of tauRecDOC means that the currently observed exothermic deviation rHC_Dvt is of higher weight, because there are higher heat currents, i.e. the exothermy runs faster through the catalyst 120 or the heat generated by the exothermic reaction in the catalyst arrives faster downstream of the catalyst 120. Thus, the reciprocal value of the heat flow rate time tauRecDOC (scalable with an applicable factor faclGovScale) is to be used as the integrator constant. The value tauRecDOC is in particular calculated from the exhaust mass flow dmEG and the application values m_DOC (mass of the catalyst 120), cp_DOC (specific heat capacity of the catalyst substrate), and cp_EG (specific heat capacity of the exhaust gas).

The calculation of the adaptation factor rHC_Adapt is released via a release status, which is in particular only set during a running particulate filter regeneration. Outside of a regeneration, the adaptation factor rHC_Adapt remains frozen. In the next regeneration, the calculation is continued starting at the stored value of the adaptation factor rHC_Adapt. In the example shown, an initial value for the adaptation factor rHC_Adapt is assumed to be 1.

The second embodiment includes an optional calculation 240 of a weighting factor facWghtExo. The aim is to open the possibility of weighting the current entry of the exothermy into the calculation of the adaptation factor as a function of the conditions of the HC model. Because the adaptation factor rHC_Adapt is to be used for catalyst monitoring during an engine cold start or a post-heating mode, the adaptation is to take into account, in particular, exothermic phases having HC model conditions (e.g. after-injection amount level, load point collective) that are typical for the phases of engine cold start heating or after-heating mode. By contrast, adaptation phases that have rather atypical conditions for the HC model during engine cold start heating or after-heating are less strongly weighted in the adaptation.

Figure 5:
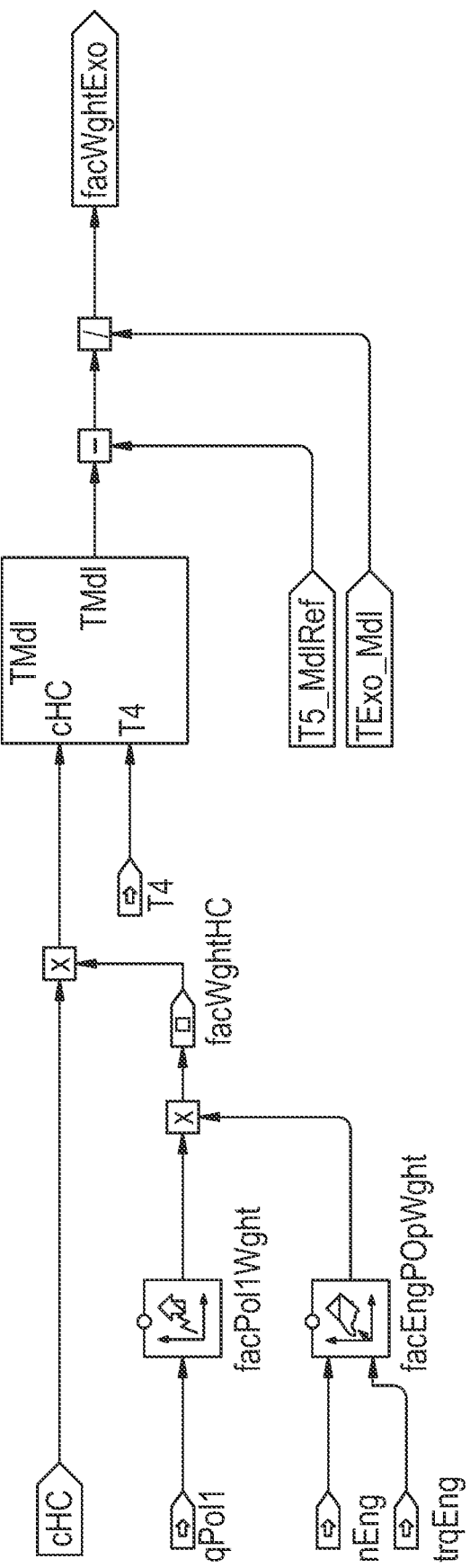
FIG. 5 shows a weighting function as it can be used in the context of the configuration of the invention shown in FIG. 4, in the form of a schematic block diagram.

An exemplary calculation of the weighting factor facWghtExo is shown in FIG. 5. It includes some applicable weighting factors on the input side, for example a factor facPol1Wght as a function of the after-injection amount qPoI1 and a factor facEngPOpWght as a function of the engine load point (speed nEng and torque trqEng). An applied value of 1 here means that the respective range fully enters the adaptation, while a value of 0 means a total suppression for the adaptation.

These weighting factors are pooled to a confidence factor of the cHC calculation facWghtHC and ultimately multiplied up to the HC model concentration cHC. By means of a catalyst-temperature model, one obtains a temperature downstream of the catalyst modeled in consideration of the confidence factor and, after subtraction of the reference model temperature T5_MdlRef, an exothermic stroke modeled in consideration of the confidence factor, which is then weighted with the modeled exothermic stroke (without the confidence factor) in order to determine a weighting factor on an exothermic basis facWghtExo. This conversion takes into account the variable delay time between HC concentration change and temperature change, because the adaptation itself takes place on an exothermic basis.

The resulting weighting factor facWghtExo is ultimately multiplied up to the integrator input value rHC_Dvt, as shown in FIG. 4.

Figure 6:
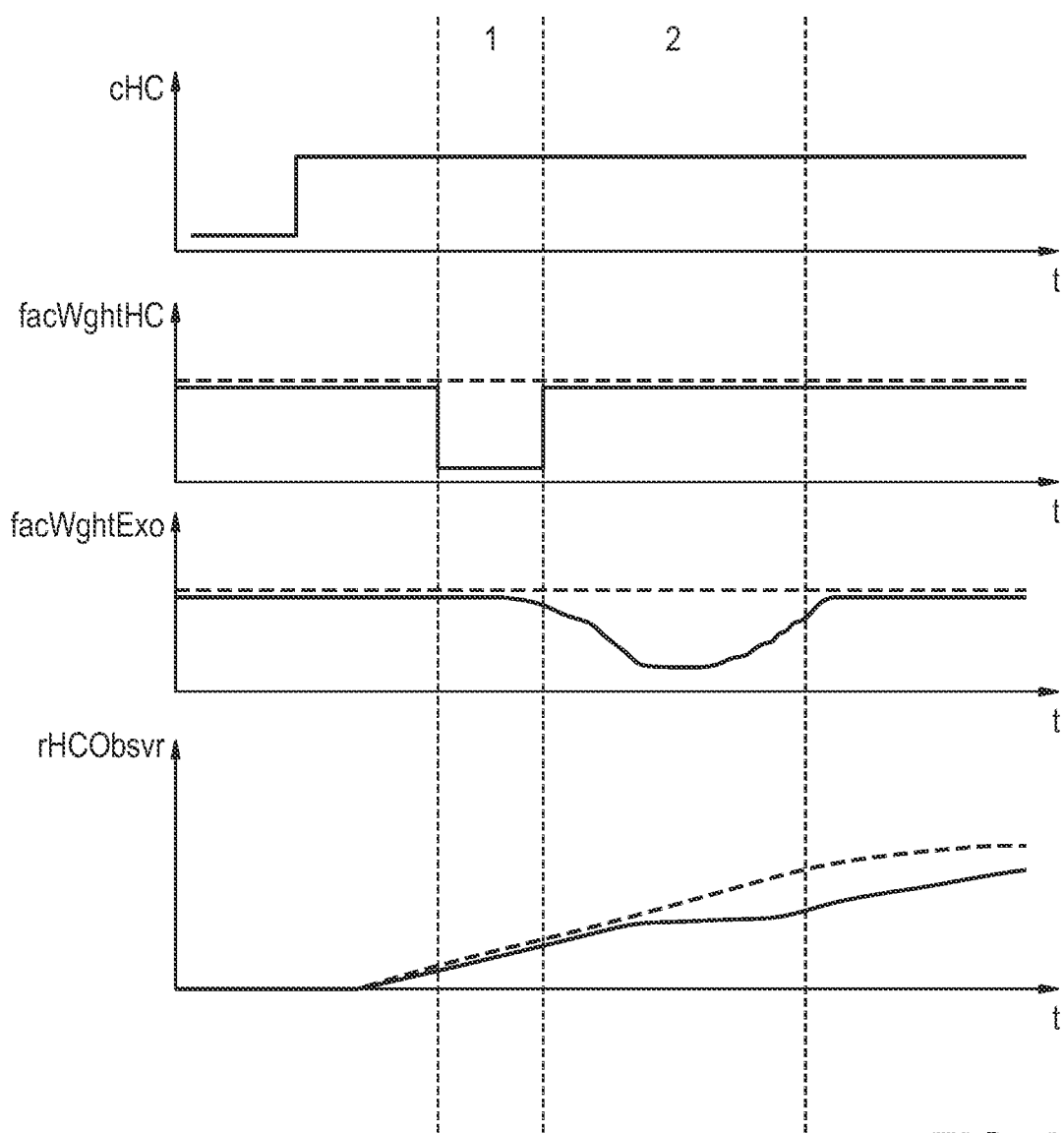
FIG. 6 schematically illustrates the temporal offset between different values when applying an advantageous configuration of the invention in the form of diagrams over time.

FIG. 6 exemplifies the functionality of the weighting factor on the basis of charts, each showing the time-based (t) course of relevant values relative to each other. The temporal offset between the individual values shown becomes clear.

In an alternative configuration, the adaptation factor rHC_Adapt or its change, i.e. the adjustment during the last particulate filter regeneration, is taken into account in the release conditions (release) of the catalyst diagnosis. Thus, it can be ensured that the diagnosis only runs if the adaptation factor rHC_Adapt has been sufficiently precisely learned or determined.

The invention claimed is:

1. A method (200) for determining an amount of hydrocarbons in an exhaust gas (10) downstream of a lean-operation internal-combustion engine (110), comprising the following steps:
   executing, with a computing unit coupled to the internal-combustion engine (110), a first catalyst heating mode of the internal-combustion engine (110) at a first catalyst temperature, wherein a predefinable amount of fuel having a predominantly non-combusting portion is introduced into a combustion chamber of the internal-combustion engine (110),
   sensing an actual temperature change downstream of an oxidation catalyst (120) downstream of the internal-combustion engine (110) during the first catalyst heating mode,
   determining, with the computing unit, the amount of hydrocarbons (cHC) in the exhaust gas (10) upstream of the oxidation catalyst (120) based on the actual temperature change,
   calculating an expected temperature change (TExo_Mdl) downstream of the oxidation catalyst (120), taking into account the predefinable amount of fuel, and
   correcting (rHC_Adapt) the calculation of the expected temperature change based on a difference (TExo_Dvt) between the actual temperature change and the expected temperature change (TExo_Mdl).

2. The method (200) according to claim 1, further comprising:
   adjusting the predefinable amount of fuel based on the actual and/or expected temperature change.

3. The method (200) according to claim 1, further comprising:
   executing a second catalyst heating mode of the internal-combustion engine (110), taking into account the correction (rHC_Adapt) of the calculation of the expected temperature change (TExo_Mdl) and/or taking into account the adjustment of the predefinable amount of fuel,
   calculating a further expected temperature change downstream of the oxidation catalyst (120) during a second rich phase,
   determining a further actual temperature change downstream of the oxidation catalyst (120) during the second rich phase, and
   assessing a catalyst efficiency based on a difference (TExo_Dvt) between the further expected temperature change and the further actual temperature change,
   wherein the second catalyst heating mode is carried out such that a lower temperature (T5_Meas) compared to the first catalyst heating mode is established downstream of the internal-combustion engine (110).

4. The method (200) according to claim 1, wherein the expected and/or a further expected temperature change (TExo_Mdl) is determined using a first computational rule (220) that calculates the theoretical temperature (T5_MdlRef) downstream of the catalyst (120) under the prerequisite of a normal phase in which no non-combustible fuel is introduced into the combustion chamber of the internal-combustion engine (110) and using a second computational rule (210) that calculates the theoretical temperature (T5_Mdl) downstream of the catalyst (120), taking into account the non-combusting portion of the predefinable amount of fuel.

5. The method according to claim 1, wherein a weighting factor (facWghtExo) based on a confidence factor (facWghtHC) of the determination of the amount of hydrocarbons (cHC) in the exhaust gas (10) and/or a temporal delay between a change in the amount of hydrocarbons (cHC) in the exhaust gas (10) and a change in temperature (T5_Mdl) downstream of the catalyst (120) is calculated (240) and accounted for in the calculation of the expected temperature change (TExo_Mdl).

6. The method according to claim 5, wherein the weighting factor (facWghtExo) is calculated as a quotient from a temperature change calculated based on the amount of hydrocarbons (cHC) accounted for with the confidence factor (facWghtHC) and the temperature change (TExo_Mdl) expected without consideration of the confidence factor (facWghtHC).

7. The method (200) according to claim 1, wherein a particulate filter (130) is provided downstream of the oxidation catalyst (120), and wherein, during the first catalyst heating mode of the internal-combustion engine (110), the particulate filter (130) is regenerated.

8. A computing unit (140) configured to:
execute a first catalyst heating mode of the internal-combustion engine (110) at a first catalyst temperature, wherein a predefinable amount of fuel having a predominantly non-combusting portion is introduced into a combustion chamber of the internal-combustion engine (110),
receive, from an exhaust temperature sensor (125), an actual temperature change downstream of an oxidation catalyst (120) downstream of the internal-combustion engine (110) during the first catalyst heating mode,
determine the amount of hydrocarbons (cHC) in the exhaust gas (10) upstream of the oxidation catalyst (120) based on the actual temperature change,
calculate an expected temperature change (TExo_Mdl) downstream of the oxidation catalyst (120), taking into account the predefinable amount of fuel, and
correct (rHC_Adapt) the calculation of the expected temperature change based on a difference (TExo_Dvt) between the actual temperature change and the expected temperature change (TExo_Mdl).

9. A non-transitory computer-readable medium including instructions executable by an electronic processor to perform a set of functions, the set of functions comprising:
executing a first catalyst heating mode of an internal-combustion engine (110) at a first catalyst temperature, wherein a predefinable amount of fuel having a predominantly non-combusting portion is introduced into a combustion chamber of the internal-combustion engine (110),
receiving, from an exhaust temperature sensor (125), an actual temperature change downstream of an oxidation catalyst (120) downstream of the internal-combustion engine (110) during the first catalyst heating mode,
determining the amount of hydrocarbons (cHC) in the exhaust gas (10) upstream of the oxidation catalyst (120) based on the actual temperature change,
calculating an expected temperature change (TExo_Mdl) downstream of the oxidation catalyst (120), taking into account the predefinable amount of fuel, and
correcting (rHC_Adapt) the calculation of the expected temperature change based on a difference (TExo_Dvt) between the actual temperature change and the expected temperature change (TExo_Mdl).

\* \* \* \* \*